Oct. 19, 1965 J. F. REUTHER ETAL 3,213,424
SIGNALLING SYSTEM HAVING CONTROL MEANS AT BOTH DISPATCH
AND REMOTE STATIONS CONNECTED THROUGH
STATIC INVERTER TRANSFORMERS
Filed Sept. 6, 1960
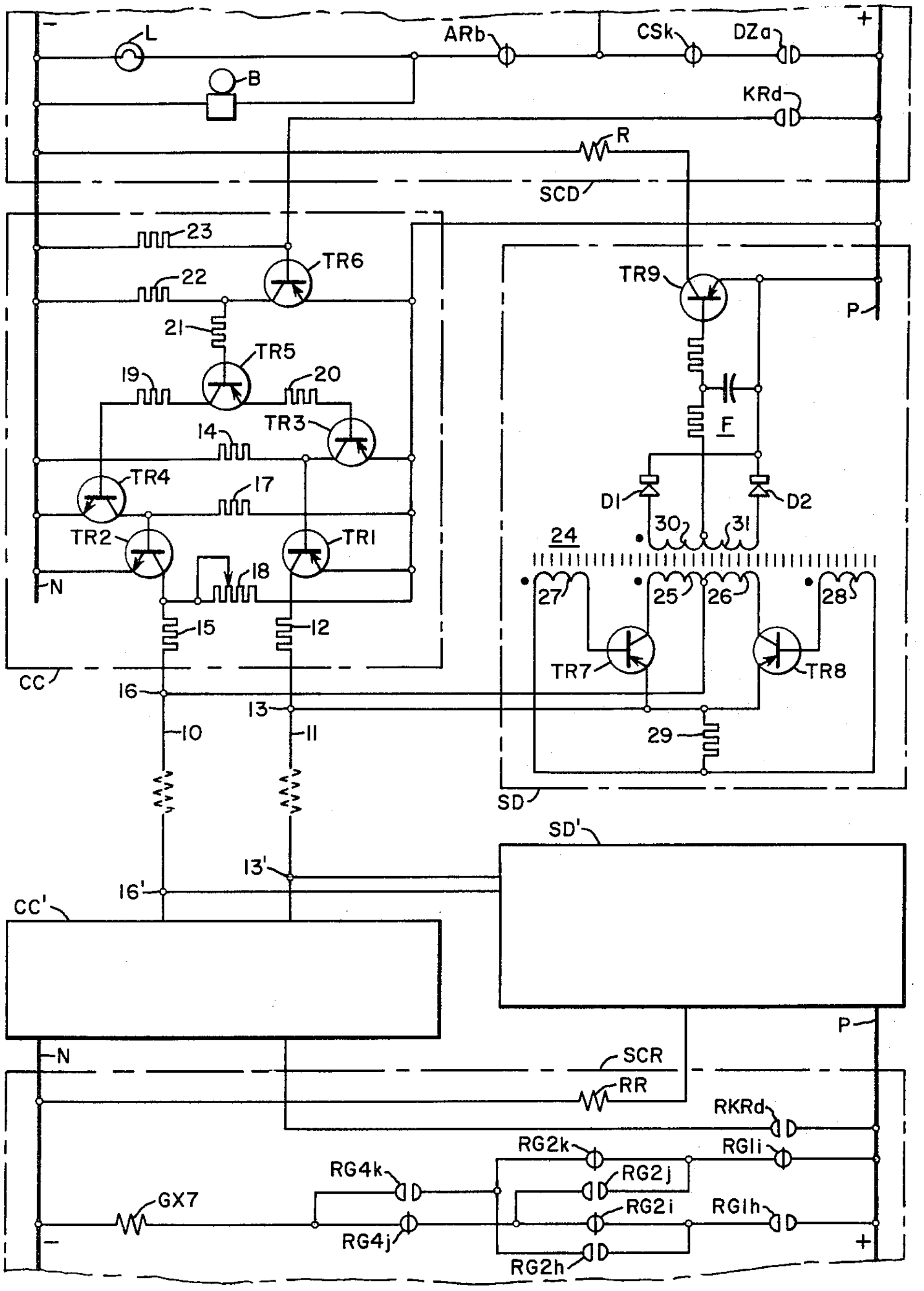
WITNESSES:
Bernard R. Giegucy
James F. Young
INVENTORS
Sheldon D. Silliman and
John F. Reuther.
BY
Ralph W. McIntire
ATTORNEY 3,213,424

SIGNALLING SYSTEM HAVING CONTROL MEANS AT BOTH DISPATCH AND REMOTE STATIONS CONNECTED THROUGH STATIC INVERTER TRANSFORMERS

John F. Reuther, Penn Hills, and Sheldon D. Silliman, Forest Hills, Pa., assignors to Westinghouse Electric Corporation, East Pittsburgh, Pa., a corporation of Pennsylvania Filed Sept. 6, 1960, Ser. No. 54,101
4 Claims. (Cl. 340—163)

This invention relates generally to line wire circuits, and it has reference in particular to line wire circuits for use with supervisory and control systems utilizing coded impulses.

The present supervisory and control apparatus most generally utilize a parallel line impulse circuit to supervise and control remote devices since it may be used to provide a continuous circuit for remote telemetering and signal channel supervision. Reference is made to Patent No. 2,550,109, issued April 24, 1951, by W. A. Derr and assigned to the same assignee as the present application, as an example of such utility of the parallel line circuit. Specifically, a line relay at the dispatch office is connected in parallel through two line wires to a line relay at a remote station so that actuation of automatic coding means at the dispatch office or the remote station causes a corresponding impulse relay for each line relay to connect the line wires and both line relays to the positive and negative terminals of the dispatch office or the remote station batteries, respectively, depending upon whether the dispatch office or the remote station is initiating the pulsing operation. Thus, the impulsing of the line relays may be controlled from either end of the line wires and the action of the relays is exactly the same in either case. In order to prevent false operation of the line relays resulting from the grounding of either the dispatch office or remote station batteries respectively, the coding apparatus at the dispatch office and remote station each operates two pairs of contacts to connect the line relays to the respective batteries, with the first pair of contacts connected between one end of the relay coil and the positive side of the battery and with the other pair of contacts connected between the negative side of the battery and the other end of the coil of the line relay. The dispatch office and remote station each consist of a coding means including the impulse relay for energizing the line relays, and a receiving means for operating equipment in response to operation of the line relay. Proper interlocking between the coding means and receiving means at each of the dispatch office and the remote station places either one of the dispatch office or remote station in a receiving condition when the other is transmitting a code of impulses.

The disadvantage of the hereinbefore described line wire circuit lies in the use of mechanical relays and the susceptibility of their contacts to wearing and pitting.

It is an object of this invention to provide in a remote control system a static line wire circuit for detecting signals at one station and transferring them to operate equipment at another station.

More specifically, it is an object of this invention to provide in a line wire circuit static switch means for energizing the line wires in response to pulsing signals.

More specifically, it is an object of this invention to provide in a line wire circuit transistor means switchable to a low impedance condition to provide energization of the line wire by the battery and switchable to a high impedance condition of several megohms to provide isolation of the line wires from the station battery.

It is a further object of this invention to provide in remote control apparatus static switch means for energizing the line wires in response to control signals and static signal detecting means at a remote station for controlling apparatus in response to energization of the line wires.

It is a further object of this invention to provide in a parallel line wire circuit static switch means at each of a dispatch office and a remote station for energizing a static signal detecting means at the remote station and the dispatch office, respectively.

Other objects will in part be obvious, and will in part appear hereinafter.

In accordance with this invention, a first inverter comprised of static elements is connected to respond to the dispatch office battery through a static switch device comprised of a complementary pair of transistors each of which operates in a switching mode in response to a corresponding one of a second pair of complementary transistors. A driver transistor is connected to simultaneously switch both transistors of the second pair to either a first state of conduction or a second state of non-conduction, in response to the switching operation of a single input transistor. At the remote station, a second static inverter, identical in structure to the first static transistor inverter, is connected in parallel circuit relationship with the first static inverter through a pair of line wire conductors so that operation of the static switch device at the dispatch office simultaneously energizes or deenergizes both inverters. The static inverter at the remote station is connected to be energized by the remote station battery through a static switching device identical to the transistor switching device at the dispatch office. The line wire conductors which connect the static inverters in parallel relationship, as previously described, provide for parallel operation of both inverters by the remote station battery in response to the operation of the remote station static switching device. In the foregoing manner the operation of the static switching device for a control circuit at either the dispatch office or the remote station provides for operation of both static inverters or signal detectors by the battery at the dispatch office or the remote station, respectively.

For a more complete understanding of the nature and scope of this invention, reference may be made to the following detailed description in connection with the accompanying drawings, in which the single figure is a diagrammatic view of one embodiment of the invention.

Referring to the drawing, a pair of identical signal detectors SD and SD′ are connected in parallel by means of a pair of line wires 10 and 11 for simultaneous operation in response to the operation of each one of two identical control circuits CC and CC′ which are independently operable in response to coding pulses to connect the line wires to an appropriate source of energy individual to each control circuit. The control circuit CC and the signal detector SD may be located at a dispatch office at one end of the line wires 10, 11 while the control circuit CC′ and the corresponding signal detector SD′ may be located at a remote station at the other end of the line wires 10, 11.

The control circuit CC includes a pair of complementary transistors TR1, TR2 which, when simultaneously switched to saturation, connect the signal detectors SD and SD′ across the station battery, and which, when simultaneously switched to cutoff, effectively disconnect the signal detectors SD, SD′ from the master station battery. Alternatively, the control circuit CC′ operates to connect and disconnect the signal detectors SD and SD′ simultaneously with respect to the line wires 10, 11. Specifically, transistor TR1, of the p-n-p type, has an emitter connected to the positive terminal P of the master station battery, a collector connected through a protective resistor 12 to the line wire 11 and one input of the signal detector SD at terminal 13, and a base electrode connected through a voltage dropping resistor 14 to the negative terminal N of the master station battery. The complementary transistor TR2, of the n-p-n type, has an emitter connected to the negative terminal N of the master station battery, has a collector connected through a protective resistor 15 to line wire 10 and the other input of signal detector SD at terminal 16, and has a base electrode connected through a voltage dropping resistor 17 to positive terminal P. The signal detector SD′ and control circuit CC′ are connected to the line wires at terminals 13′ and 16′ to thus electrically actuate the signal detectors SD and SD′ for simultaneous operation by either control circuit CC or CC′, for the reasons given above.

It is seen that application of a negative potential of proper magnitude through resistor 14 to the base electrode of the base-emitter circuit of transistor TR1 provides a sufficient current flow in the base-emitter circuit to drive transistor TR1 to the low impedance or saturation condition to connect terminal 13 to the positive battery terminal P through the collector-emitter circuit of transistor TR1. Also, the application of a positive signal of proper magnitude through resistor 17 to the base electrode of the base-emitter circuit of transistor TR2 will drive transistor TR2 to saturation to connect terminal 16 to the master station battery through the low impedance of the collector-emitter circuit of transistor TR2.

When transistors TR1 and TR2 are both in a state of saturation, a circuit is completed from positive terminal P through the emitter-collector circuit of TR1, resistor 12, terminals 13 and 13′, signal detectors SD and SD′, terminals 16, 16′, resistor 15, collector-emitter circuit of transistor TR2 to negative battery terminal. Alternatively, when zero potential is applied to the base terminals of the base-emitter circuits of transistors TR1 and TR2 simultaneously as hereinafter described, the transistors are switched to the high impedance or cutoff condition, effectively opening the circuit to the line wires 10, 11 and signal detectors SD, SD′.

In order to provide for equal distribution of battery voltage across the transistors TR1 and TR2 in the event that the leakage current of the two transistors is different when the transistors are in the cutoff condition, a compensating resistor 18 is added in parallel with whichever transistor has the smaller leakage current.

In order to provide for switching transistors TR1 and TR2 simultaneously to the same state of conduction or non-conduction, that is, from saturation to cutoff, and vice versa, there is provided a transistor TR3 of the p-n-p type for switching transistor TR1, and an additional transistor TR4 of the n-p-n type for switching transistor TR2. Both of the transistors TR3, TR4 are connected to be switched simultaneously by a single control transistor TR5, which in turn is switched by a transistor TR6. Specifically, transistor TR4 has an emitter connected to the negative terminal N, a collector connected to the base electrode of transistor TR2, and a base electrode connected through a current limiting resistor 19 to the collector electrode of transistor TR5. Transistor TR3 has a collector electrode connected to the base electrode of transistor TR1, an emitter connected to the positive terminal P, and a base electrode connected through current limiting resistor 20 to the emitter of transistor TR5. The base electrode of transistor TR5 is connected through current limiting resistor 22 to negative terminal N. Transistor TR6 has a collector electrode connected between resistors 22 and 21, an emitter connected to the positive terminal P and a base electrode connected to the negative terminal N through voltage dropping resistor 23 and also connected to the positive terminal P through contact KR*d* of keying relay KR.

The control circuits CC and CC′ may be incorporated in any conventional supervisory control apparatus utilizing parallel line wires and comprised of relays or other switching means such as transistors. As a specific example of such an embodiment, the present invention is shown incorporated in supervisory control apparatus substantially identical with that shown in copending application Serial No. 615,124, filed October 10, 1956, by Willard A. Derr and Sheldon D. Silliman, and assigned to the assignee of the present application, which has been forfeited and field as a continuation on December 12, 1960, Serial No. 75,448 and which issued January 22, 1963, as U.S. Patent No. 3,075,177. Most of the elements of the Derr et al. application are not shown, but are considered as contained within their respective enclosures, wherein enclosure SCD represents the supervisory control dispatch office equipment and enclosure SCR represents the supervisory control remote station equipment.

The operation of the static control circuit CC is controlled by the interrelated pulsations of the keying relay KR (not shown) and the receiving relay R at the dispatch office of the Derr et al. patent.

While the operation of control circuit CC′ is similarly controlled by a similar keying relay and receiving relay at the remote station of the Derr et al. patent. The coding pulsations of the keying relays and the receiving relays are fully explained in detail in the Derr et al. application. Specifically, in the operation of the present invention, when contacts KR*d* of the Derr et al. application open to start a pulsation operation, transistor TR6 is driven to saturation, thus completing a circuit through its collector-emitter circuit to ground the base electrode of transistor TR5 effecting cutoff of transistor TR5. The cutoff condition of transistor TR5 effectively opens the emitter-base circuits of transistors TR3 and TR4, thus effecting the switching of transistors TR3 and TR4 simultaneously to the cutoff condition. The cutoff condition of transistors TR3 and TR4 effectively eliminates the shunt circuit for the base-emitter circuit of transistors TR1 and TR2, respectively; therefore, the transistors TR1 and TR2 are driven simultaneously to the saturation condition to thus connect the line wires 10 and 11 to the dispatch office station battery and provide operating energy for the signal detectors SD and SD′. The energization of receiving relay R by the signal detector SD, as will be hereinafter described in detail, effects operation of the keying relay KR to effect closing of the contacts KR*d* in the manner described in the Derr application. Consequently, the base electrode of transistor TR6 is grounded to effect cutoff of transistor TR6 which eliminates the shunt circuit across the base-emitter circuit of transistor TR5. Accordingly, transistor TR5 switches to the saturation condition, thus completing the base-emitter circuits for transistor TR4 and transistor TR3, which simultaneously assume the saturation condition. The saturation of transistors TR3 and TR4 simultaneously grounds the base electrodes of transistors TR1 and TR2 to effect cutoff of transistors TR1 and TR2, thus effecting deenergization of the line wires 10 and 11 and deenergization of signal detectors SD and SD′. This completes the transmission and reception of a single pulse.

In the foregoing description, the interposition of transistor TR3 between transistor TR1 and TR5 and the interposition of transistor TR4 between transistor TR2 and transistor TR5 minimizes interaction between transistor TR5 and each of transistors TR2 and TR1, and more positively assures switching action of transistors TR1 and TR2 in response to the driving action of transistor TR5.

The signal detector SD comprises a static inverter having its input connected to the line wires 10 and 11 in combination with a sensing circuit including a rectifier connected to the output of the inverter for providing a direct current output to operate the equipment at the corresponding station. The inverter is comprised of two transistors TR7 and TR8 connected to a saturable core transformer 24 so that the two transistors alternately conduct to switch a direct current input voltage across different windings of the saturable core transformer thus causing the core flux to be cycled between positive and negative to provide a square wave output from the transformer, the square wave output having a frequency directly proportional to the magnitude of the direct current voltage input. Specifically, transistors TR7 and TR8 have their emitters connected to the line wire 11 at terminal 13 while their collectors are connected through transformer windings 25 and 26, respectively, of transformer 24 to the line wire 10 at terminal 16. The base and emitter electrodes of transistor TR7 are series connected with windings 27 of transformer 24 while the base and emitter electrodes of transistor TR8 are series connected with winding 28 of transformer 24.

In operation, the application of a direct current voltage from the battery terminals P and N through the line wires 10 and 11 causes one or the other of transistors TR7 and TR8 to conduct because of inherent inequalities in the circuits of the respective transistors. When transistors TR7 is conducting, the voltage drop across the line wires 10 and 11 is placed across winding 25 which induces a first voltage in winding 27 causing transistor TR7 to continue to saturate, and induces a second voltage in winding 28 causing transistor TR8 to cutoff. Transistor TR7 conducts until the transformer is saturated, at which point the induced voltage in the transformer disappears to terminate the base drive to transistor TR7 which switches to a cutoff condition thus opening the circuit winding 25. Thereafter, the core flux drops back from maximum saturation to its inherent retentive value and in so doing provides a flux change inducing a voltage of opposite polarity in the windings. This places a negative voltage on the base of transistor TR8 which conducts causing a flux decrease until transistor TR8 is conducting heavily. The input voltage from the line wires 10, 11 is now across winding 26 to produce saturation of the core in the opposite direction. The output voltage across windings 30 and 31 of transformer 24 is a square wave where the duration of each half cycle is determined by the time necessary for the core flux to change from negative saturation to positive saturation, which in turn is inversely proportional to the magnitude of the input voltage. Therefore, for a given transformer, the output frequency of the inverter is proportional to the direct current input thereto, which input in this instance is provided by the station battery connected to the battery treminals P and N.

The signal sensing stage of the signal detector SD is a static inverter and is substantially identical to that of Patent No. 2,783,384, patented by R. L. Bright et al. February 26, 1957, and includes a pair of diodes D1, D2 and a filter F connected across the output windings 30, 31 to provide a direct current output for controlling transistor TR9. Transistor TR9 has a collector connected to the negative battery terminal through the coil of pulsing relay or receiving relay R, an emitter connected to the positive terminal P and the positive side of the filter F, and has a base electrode connected to the negative side of the filter F.

In the operation of the signal detector SD, when a pulse is applied to the line wires 10, 11 by operation of the control circuit CC as previously described, the inverter operates to provide an A.-C. output to the input of the sensing circuit which converts the A.-C. to direct current to effect saturation of the transistor TR9, which, in turn, conducts to complete a circuit through its collector-emitter electrodes to connect the relay R across the battery terminals P and N. Relay R operates in the manner fully described in the hereinbefore mentioned copending application to operate the keying relay KR and effect the closing of the contacts KR*d*.

It is seen that the substitution of a static inverter and rectifier for a relay provides greater durability and reliability by eliminating the need for a mechanical relay, and at the same time, provides, through the transformer of the inverter, isolation between the line wire circuit and the circuits of the supervisory control equipment, the latter consideration being of particular advantage when it is desired to use the hereinbefore described static line wire circuit and signal detector in a supervisory control system comprised entirely of static elements.

An additional advantage in the use of the inverter as a signal detector in the static line wire system lies in the further utility of the inverter as a detector for sensing telemetering signals transmitted over the line wires 10, 11. For example, if the direct current voltage applied to the line wire circuit is made proportional to a quantity being measured, the remote inverter frequency is proportional to the input voltage and the output of the remote inverter would be converted from a frequency signal into a direct current which is proportional to the original measured quantity.

Since certain changes may be made in the construction of the above-described apparatus and different embodiments of the invention may be made without departing from the spirit and scope thereof, it is intended that all the matter contained in the above description and shown in the accompanying drawings shall be considered as illustrative and not in a limiting sense.

We claim as our invention:

1. A signaling system consisting of a dispatch station and a remote station each having supervisory control equipment therein for communicating over a pair of line wires: signal detecting means comprising a static inverter including a transformer, said signal detecting means being connected across the line wires at each of the dispatch station and the remote station; a pair of static switches at each of the dispatch station and the remote station; separate direct current energy sources at said dispatch station and at said remote station; one switch of each pair for connecting one line wire to one potential side of a direct current energy source at its station and the other switch of each pair for connecting the other line wire to the other potential side of said direct current source at its station; independently operable control means at each station operable to switch a corresponding pair of switches simultaneously in a first direction from the same one of two states to the other to effect the simultaneous connecting of the signal detecting means at said dispatch station and said remote station to the energy source at which ever station operates the switches, said control means at each station being also operable to switch a corresponding pair of switches simultaneously in a second direction from the other to said same one of said two states to effect the simultaneous disconnecting of the signal detecting means at said dispatch station and said remote station from the energy source at whichever station operated the switches to connect the signal detecting means; and said inverter transformer isolating the supervisory control equipment and the direct current source at said dispatch station and at said remote station from the line wires.

2. A signaling system consisting of a dispatch station and a remote station each having supervisory control equipment therein for communicating over a pair of line wires: signal detecting means comprising a static inverter including a transformer having input windings connected in circuit relation with the line wires and output windings connected to the supervisory control equipment at each of the dispatch station and the remote station; a pair of semiconductor static switches at each of the dispatch station and the remote station; separate direct current energy sources at said dispatch station and at said remote station; one switch of each pair for connecting one line wire to one potential side of a direct current energy source at its station and the other switch of each pair for connecting the other line wire to the other potential side of said source at its station; independent control means at each station operable to switch a corresponding pair of switches simultaneously in a first direction from the same one of two states to the other to effect the simultaneous connecting of the signal detecting means at both stations to the energy source at whichever station operates the switches, said control means at each station being also operable to switch a corresponding pair of switches simultaneously in a second direction from the other to said same one of said two states to effect the simultaneous disconnecting of the signal detecting means at said dispatch station and said remote station from the energy source at whichever station operated the switches to connect the signal detecting means, and said inverter transformer isolating the supervisory control equipment and the direct current source at said dispatch station and at said remote station from the line wires.

3. A signaling system, comprising: a dispatch station and a remote station adapted for communicating over a pair of line wires; signal detecting means comprising an inverter at each of the dispatch station and the remote station and connected across the line wires; separate sources of direct current energy at said dispatch station and at said remote station; switch means at each station for connecting and disconnecting said source of direct current energy at the station to the signal detecting means and the line wires; said switch means comprising a first switching transistor having an input circuit connected in circuit relation with the direct current source and having an output circuit for connecting one side of the signal detector to the positive terminal of the direct current source, and a second switching transistor having an input connected in circuit relation with the direct current source and having an output connecting the other side of the signal detector to the negative terminal of the direct current source; and static control means at each station operable to shunt the input circuit of the switching transistors simultaneously to simultaneously connect the direct current source at one station to energize the signal detecting means at both stations, said inverter including a transformer which isolates the direct current source at each station from said line wires.

4. A signaling system consisting of a first station and a second station for communicating over a pair of line wires; separate direct current sources at said first and second stations; static switch means at each of the first station and the second station for connecting the line wires to the direct current source thereat; signal detecting means comprising a static inverter at each station and having its input across the line wires at the corresponding station and including a transformer means in the output, said signal detecting means at both stations being simultaneously energized by said switch means when the source at one station is connected to said line wires; coding and receiving means at each station responsive to the output of the inveter and the switching of the static switch means to provide pulsations of direct current energy on the line wires to send pulse codes, and for selecting different ones of a plurality of apparatus at the station in response to the output of the signal detector means when the code is being received from the other station, and said transformer means in the inverter isolating said coding and receiving means and the direct current source at said first station and at said second station from said line wires.

References Cited by the Examiner

UNITED STATES PATENTS

| | | | |
|---|---|---|---|
| 2,550,109 | 4/51 | Derr | 340—180 |
| 2,905,835 | 9/59 | Wray | 307—88.5 |
| 3,050,639 | 8/62 | Tate | 307—88.5 |

FOREIGN PATENTS

| | | |
|---|---|---|
| 1,157,320 | 5/58 | France. |

OTHER REFERENCES

Brown et al.: Control Engineering, December 1956, pp. 70–76.

NEIL C. READ, *Primary Examiner.*

IRVING L. SRAGOW, *Examiner.*